US012700547B2

(12) United States Patent
Saita

(10) Patent No.: US 12,700,547 B2
(45) Date of Patent: Aug. 4, 2026

(54) THIN-FILM CAPACITOR WITH PROTECTIVE INSULATING FILMS EMBEDDING CAPACITOR ELECTRODES

(71) Applicant: TDK Corporation, Tokyo (JP)

(72) Inventor: Hitoshi Saita, Tokyo (JP)

(73) Assignee: TDK Corporation, Tokyo (JP)

( * ) Notice: Subject to any disclaimer, the term of this patent is extended or adjusted under 35 U.S.C. 154(b) by 111 days.

(21) Appl. No.: 18/708,479

(22) PCT Filed: Oct. 12, 2022

(86) PCT No.: PCT/JP2022/037963
§ 371 (c)(1),
(2) Date: May 8, 2024

(87) PCT Pub. No.: WO2023/095473
PCT Pub. Date: Jun. 1, 2023

(65) Prior Publication Data
US 2025/0006428 A1     Jan. 2, 2025

Related U.S. Application Data

(60) Provisional application No. 63/283,186, filed on Nov. 24, 2021.

(51) Int. Cl.
*H01G 4/33* (2006.01)
*H01G 4/224* (2006.01)
*H01G 4/228* (2006.01)

(52) U.S. Cl.
CPC .............. *H01G 4/33* (2013.01); *H01G 4/224* (2013.01); *H01G 4/228* (2013.01)

(58) Field of Classification Search
None
See application file for complete search history.

(56) References Cited

U.S. PATENT DOCUMENTS

| 2009/0231820 A1 | 9/2009 | Tanaka |
| 2016/0183379 A1 | 6/2016 | Song et al. |
| 2019/0392992 A1 | 12/2019 | Kumagae et al. |

FOREIGN PATENT DOCUMENTS

| CN | 212365758 U | | 1/2021 |
| JP | 57-146325 | * | 9/1982 |

(Continued)

OTHER PUBLICATIONS

Translation JP 57-146325 (no date).*

(Continued)

*Primary Examiner* — Eric W Thomas
(74) *Attorney, Agent, or Firm* — RIMON P.C.

(57) ABSTRACT

A thin film capacitor 1 includes a dielectric layer, capacitor electrodes formed respectively on first and second surfaces of the dielectric layer, a protective insulating film formed on the first surface of the dielectric layer so as to embed therein one of the capacitor electrodes, a protective insulating film formed on the second surface of the dielectric layer so as to embed therein the other of the capacitor electrodes, and terminal electrodes connected respectively to the capacitor electrodes. One of the terminal electrodes includes a first section positioned on the upper surface of the protective insulating film and partly overlapping the other of the capacitor electrode and a second section positioned on the side surface of the protective insulating film so as to contact the one of the capacitor electrodes. The other of the terminal electrodes is not formed on the upper surface of the protective insulating film.

19 Claims, 4 Drawing Sheets

(56)         References Cited

FOREIGN PATENT DOCUMENTS

| JP | H02222124 | A | * | 9/1990 | | |
| JP | H07106198 | A | * | 4/1995 | | |
| JP | 2009-224786 | A | | 10/2009 | | |
| JP | 2014-183104 | A | | 9/2014 | | |
| JP | 2020-004953 | A | | 1/2020 | | |
| KR | 20150031913 | A | * | 3/2015 | ............ | H01G 4/005 |

OTHER PUBLICATIONS

Translation JP 07-106198 A (no date).*
International Search Report received in PCT Application No. PCT/JP2022/037963, dated Dec. 20, 2022.

* cited by examiner

THIN-FILM CAPACITOR WITH PROTECTIVE INSULATING FILMS EMBEDDING CAPACITOR ELECTRODES

CROSS-REFERENCE TO RELATED APPLICATIONS

This application is the U.S. National Phase under 35 U.S.C. § 371 of International Application No. PCT/JP2022/037963, filed on Oct. 12, 2022, which claims the benefit of U.S. Provisional Application No. 63/283,186 filed on Nov. 24, 2021, the entire contents of each of which are hereby incorporated by reference.

TECHNICAL FIELD

The present invention relates to a thin film capacitor.

BACKGROUND ART

Patent Document 1 discloses an electronic component having a structure in which capacitor electrodes and dielectric layers are alternately stacked. Odd-numbered capacitor electrodes are connected in common to a first terminal electrode, and even-numbered capacitor electrodes are connected in common to a second terminal electrode.

CITATION LIST

Patent Document

[Patent Document 1] JP 2014-183104A

DISCLOSURE OF THE INVENTION

Problem to be Solved by the Invention

However, the electronic component described in Patent Document 1 has a configuration in which a plurality of capacitors are connected in parallel and is thus not suitable for application where a high voltage is applied thereto.

An object of the present invention is therefore to provide a thin film capacitor suitable for application where a high voltage is applied thereto.

Means for Solving the Problem

A thin film capacitor according to one aspect of the present invention includes: a dielectric layer having a first surface and a second surface positioned on the opposite side of the first surface; a first capacitor electrode formed on the first surface of the dielectric layer; a second capacitor electrode formed on the second surface of the dielectric layer; a first protective insulating film formed on the first surface of the dielectric layer so as to embed therein the first capacitor electrode; a second protective insulating film formed on the second surface of the dielectric layer so as to embed therein the second capacitor electrode; a first terminal electrode electrically connected to the first capacitor electrode; and a second terminal electrode electrically connected to the second capacitor electrode. The first terminal electrode has a first section positioned on the upper surface of the first protective insulating film and partly overlapping the second capacitor electrode and a second section positioned on the side surface of the first protective insulating film so as to contact the first capacitor electrode. The second terminal electrode is not formed on the upper surface of the first protective insulating film.

According to the present invention, there can be provided a thin film capacitor suitable for series connection.

In the present invention, the second terminal electrode may have a third section positioned on the upper surface of the second protective insulating film and partly overlapping the first capacitor electrode and a fourth section positioned on the side surface of the second protective insulating film so as to contact the second capacitor electrode, and the first terminal electrode may not be formed on the upper surface of the second protective insulating film.

This allows three or more thin film capacitors to be easily connected in series.

A thin film capacitor according to another aspect of the present invention is a thin film capacitor provided with first and second unit capacitors, the first and second unit capacitors each including: a dielectric layer having a first surface and a second surface positioned on the opposite side of the first surface; a first capacitor electrode formed on the first surface of the dielectric layer; a second capacitor electrode formed on the second surface of the dielectric layer; a first protective insulating film formed on the first surface of the dielectric layer so as to embed therein the first capacitor electrode; a second protective insulating film formed on the second surface of the dielectric layer so as to embed therein the second capacitor electrode; a first terminal electrode electrically connected to the first capacitor electrode; and a second terminal electrode electrically connected to the second capacitor electrode. The first terminal electrode has a first section positioned on the upper surface of the first protective insulating film and partly overlapping the second capacitor electrode and a second section positioned on the side surface of the first protective insulating film so as to contact the first capacitor electrode. The second terminal electrode is not formed on the upper surface of the first protective insulating film. The first and second unit capacitors are stacked such that the first section of the first terminal electrode included in the first unit capacitor and the first section of the first terminal electrode included in the second unit capacitor are connected to each other.

According to the present invention, the first and second unit capacitors are connected in series.

The thin film capacitor according to the present invention may further include a third unit capacitor having the same configuration as those of the first and second unit capacitors, the second terminal electrode may have a third section positioned on the upper surface of the second protective insulating film and partly overlapping the first capacitor electrode and a fourth section positioned on the side surface of the second protective insulating film so as to contact the second capacitor electrode, the first terminal electrode may not be formed on the upper surface of the second protective insulating film, and the first, second, and third unit capacitors may be stacked such that the third section of the second terminal electrode included in the second unit capacitor and the third section of the second terminal electrode included in the third thin film capacitor are connected to each other. This allows the first, second, and third unit capacitors to be connected in series.

Advantageous Effects of the Invention

As described above, according to the present invention, there can be provided a thin film capacitor suitable for application where a high voltage is applied thereto.

MODE FOR CARRYING OUT THE INVENTION

Hereinafter, preferred embodiments of the present invention will be described in detail with reference to the accompanying drawings.

Figure 1:
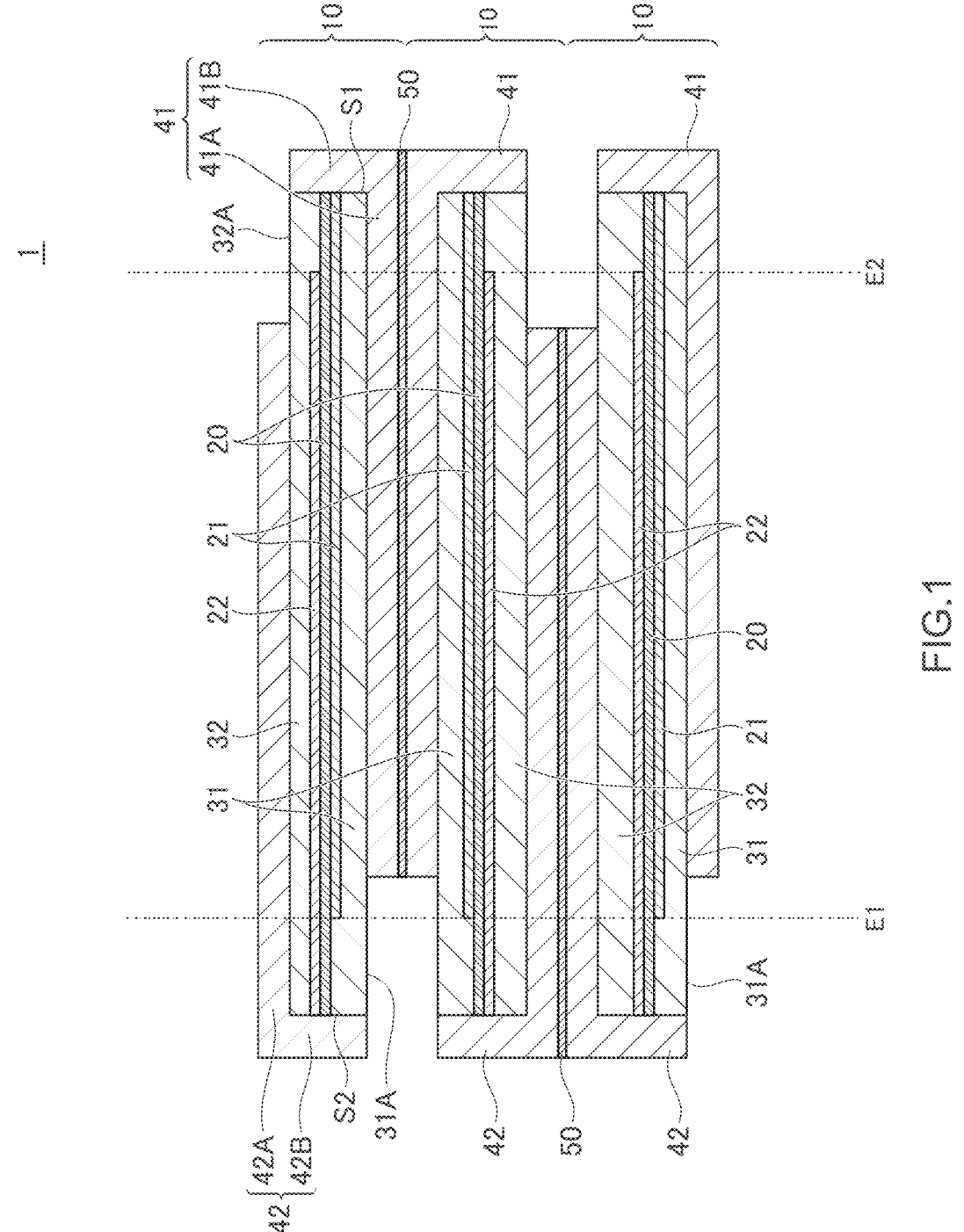
FIG. 1 is a schematic cross-sectional view for explaining the structure of a thin film capacitor 1 according to a first embodiment of the present invention.

FIG. 1 is a schematic cross-sectional view for explaining the structure of a thin film capacitor: according to a first embodiment of the present invention.

As illustrated in FIG. 1, the thin film capacitor 1 according to the first embodiment of the present invention has a structure in which a plurality of unit capacitors 10 are stacked. Although the thin film capacitor 1 illustrated in FIG. 1 has a structure in which three unit capacitors 10 are stacked, the number of the unit capacitors 10 to be stacked is not particularly limited.

The unit capacitor 10 has a dielectric layer 20, a capacitor electrode 21 formed on one surface of the dielectric layer 20, and a capacitor electrode 22 formed on the other surface of the dielectric layer 20. The capacitor electrodes 21 and 22 overlap each other through the dielectric layer 20, whereby a predetermined capacitance can be obtained.

The dielectric layer 20 is made of a perovskite dielectric material. Examples of the perovskite dielectric material include a ferroelectric material or a paraelectric material having a perovskite structure, such as $BaTiO_3$ (barium titanate), $(Ba_{1-x}Sr_x)TiO_3$ (barium strontium titanate), $(Ba_{1-x}Ca_x)TiO_3$, $PbTiO_3$, $Pb(Zr_xTi_{1-x})O_3$, $(Sr_{1-x}Ca_x)$, $(Ti_{1-y}Zr_y)$, $Ba(Mg_{1/3}Ta_{2/3})$, a composite perovskite relaxer type ferroelectric material represented by Pb $(Mg_{1/3}Nb_{2/3})O_3$, and the like, a bismuth layer compound represented by $Bi_4Ti_3O_{12}$, a tungsten bronze type ferroelectric material represented by $(Sr_{1-x}Ba_x)Nb_2O_6$ and $PbNb_2O_6$. Here, in the above-described perovskite structure, perovskite relaxer type ferroelectric material, bismuth layer compound, and tungsten bronze type ferroelectric material, the ratio of A site and B site is usually an integer ratio but may be purposefully shifted from the integer ratio in order to improve characteristics. In order to control the characteristics of the dielectric layer 20, the dielectric layer 20 may appropriately contain an additive substance as a subcomponent. The relative permittivity $(\varepsilon_r)$ is 10 or more, for example. Further, the larger the dielectric withstand voltage of the dielectric layer 20, the better, and there is not particular restriction on the upper limit value thereof. The larger the relative permittivity of the dielectric layer 20, the better, and there is not particular restriction on the upper limit value thereof. The thickness of the dielectric layer 20 is about 10 nm to about 6000 nm, for example.

The capacitor electrode 21 is made of high-melting point metal such as nickel (Ni) and functions also as a support for increasing mechanical strength of the unit capacitor 10. One surface of the dielectric layer 20 has an area covered with the capacitor electrode 21 and an area not covered therewith. The capacitor electrode 21 is covered with a protective insulating film 31 made of resin or the like. The capacitor electrode 22 is made of a low-resistance metal such as copper (Cu). The other surface of the dielectric layer 20 has an area covered with the capacitor electrode 22 and an area not covered therewith. The capacitor electrode 22 is covered with a protective insulating film 32 made of resin or the like.

Figure 2A:
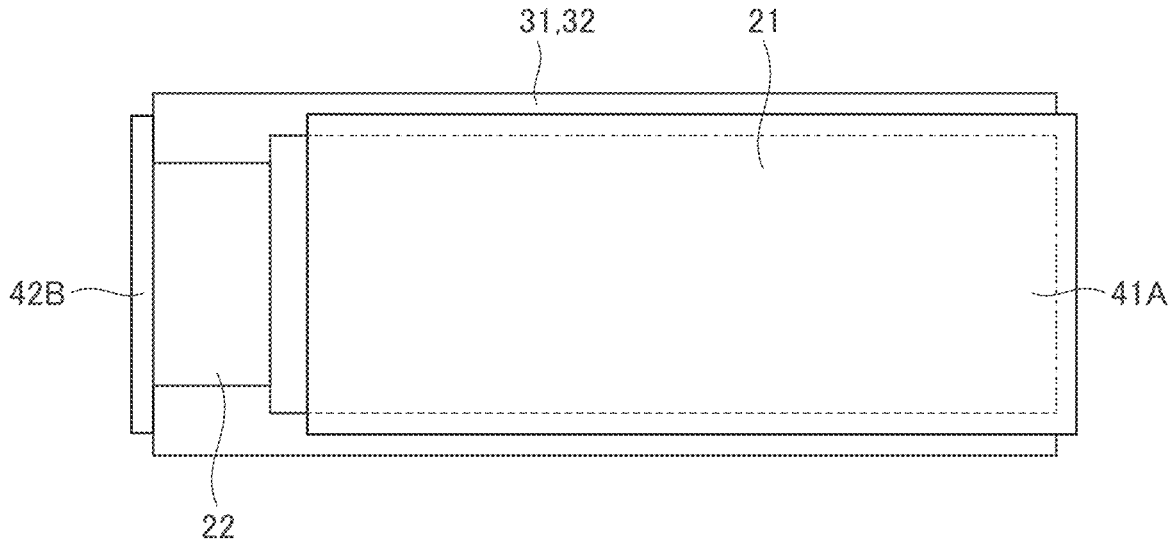
FIG. 2A is a schematic view illustrating the planar positional relation between the capacitor electrodes 21, 22 and terminal electrodes 41, 42 as viewed from the protective insulating film 31 side.
Figure 2B:
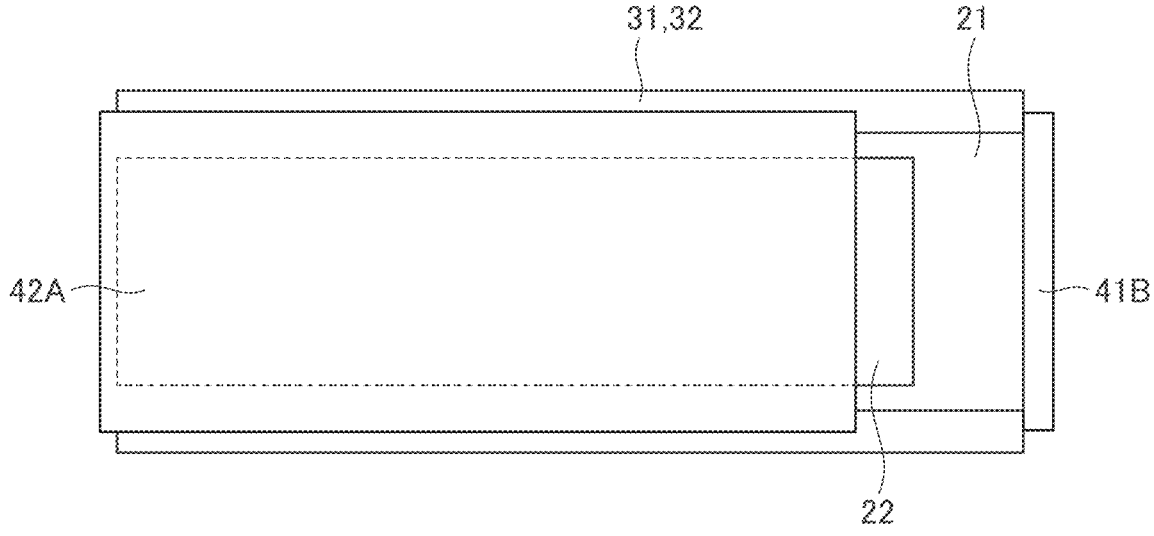
FIG. 2B is a schematic view illustrating the planar positional relation between the capacitor electrodes 21, 22 and terminal electrodes 41, 42 as viewed from the protective insulating film 32 side.

As illustrated in FIG. 1, the capacitor electrode 21 is connected to a terminal electrode 41, and the capacitor electrode 22 is connected to a terminal electrode 42. The terminal electrodes 41 and 42 are each made of low-resistance metal such as copper (Cu). The surface of each of the terminal electrodes 41 and 42 may be covered with a plating layer such as a gold (Au) playing layer. FIG. 2A is a schematic view illustrating the planar positional relation between the capacitor electrodes 21, 22 and terminal electrodes 41, 42 as viewed from the protective insulating film 31 side. FIG. 2B is a schematic view illustrating the planar positional relation between the capacitor electrodes 21, 22 and terminal electrodes 41, 42 as viewed from the protective insulating film 32 side.

The terminal electrode 41 has a first section 41A positioned on an upper surface 31A of the protective insulating film 31 and a second section 41B positioned on a side surface S1 of the stacked body. The second section 41B contacts the capacitor electrode 21 exposed to the side surface S1 of the stacked body. The terminal electrode 41 is not formed on an upper surface 32A of the protective insulating film 32. The terminal electrode 42 has a third section 42A positioned on the upper surface 32A of the protective insulating film 32 and a fourth section 42B positioned on a side surface S2 of the stacked body. The fourth section 42B contacts the capacitor electrode 22 exposed to the side surface S2 of the stacked body. The terminal electrode 42 is not formed on the upper surface 31A of the protective insulating film 31.

As viewed in the stacking direction, the edge of the first section 41A of the terminal electrode 41 is positioned inside an edge E2 of the capacitor electrode 22. That is, the first section 41A of the terminal electrode 41 overlaps the edge E2 of the capacitor electrode 22 as viewed in the stacking direction. This relaxes stress concentrated on the edge E2 of the capacitor electrode 22, thereby increasing product reliability. The first section 41A of the terminal electrode 41 covers most of the capacitor electrode 21. As viewed in the stacking direction, the edge of the third section 42A of the terminal electrode 42 is positioned inside an edge E1 of the capacitor electrode 21. That is, the third section 42A of the terminal electrode 42 overlaps the edge E1 of the capacitor electrode 21 as viewed in the stacking direction. This relaxes stress concentrated on the edge E1 of the capacitor electrode 21, thereby increasing product reliability. The first section 42A of the terminal electrode 42 covers most of the capacitor electrode 22.

The unit capacitors 10 each having the above configuration are stacked such that the protective insulating films 31 or protective insulating films 32 of the vertically adjacent unit capacitors 10 face each other, where the first sections 41A of the terminal electrode 41 are connected to each other, and the third sections 42A of the terminal electrode 42 are connected to each other. The above connections are each made through a solder 50 or the like.

5

Figure 3:
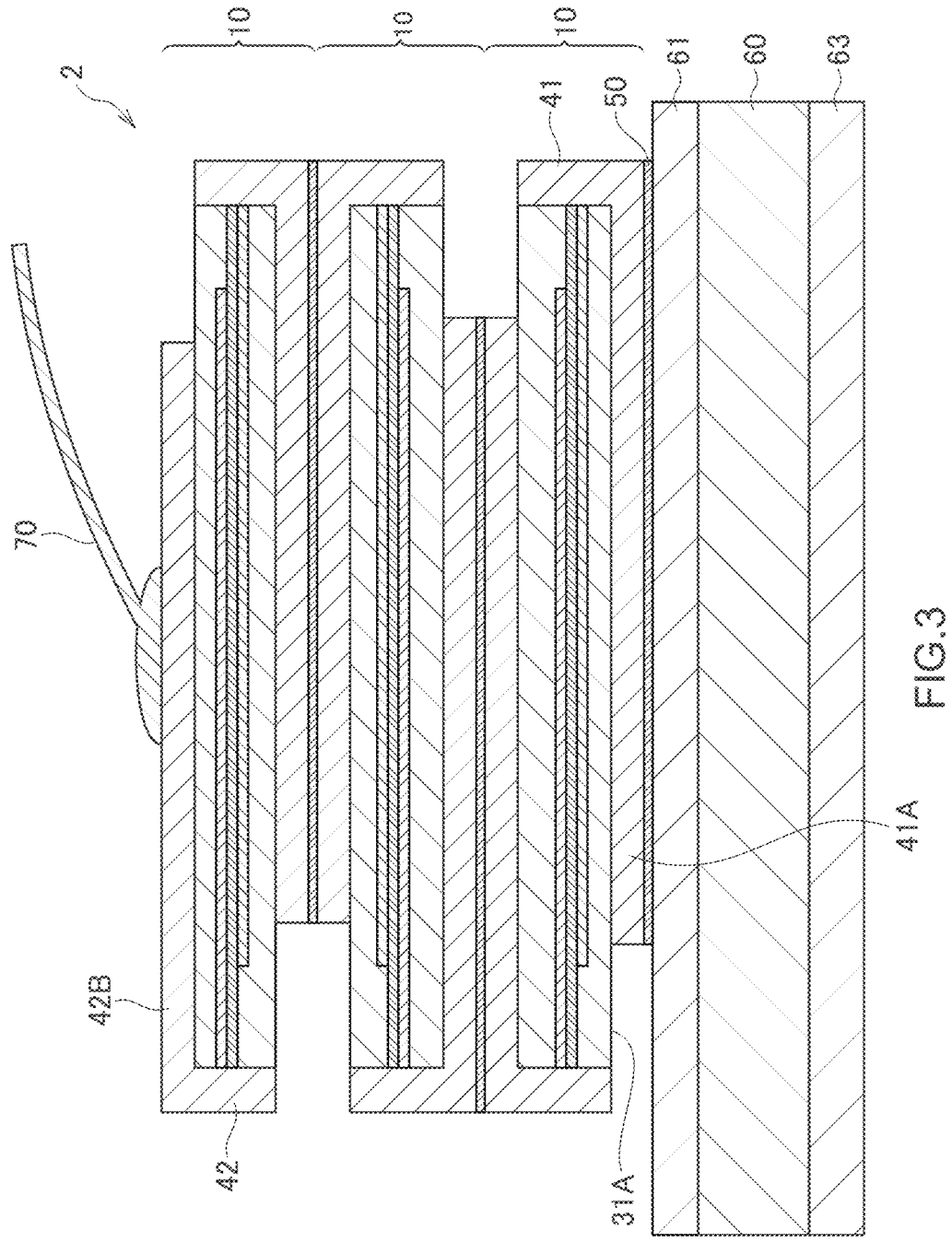
FIG. 3 is a schematic cross-sectional view illustrating a state where the thin film capacitor 1 is mounted on a DBC substrate.

FIG. 3 is a schematic cross-sectional view illustrating a state where the thin film capacitor 1 is mounted on a DBC (Direct Bonded Copper) substrate.

The DBC substrate includes a substrate 60 made of an insulating material having a high heat conductivity, such as $Al_2O_3$, AlN, or $Si_3N_4$ and copper patterns 61 and 63 formed on the surface of the substrate 60. In the example illustrated in FIG. 3, the copper pattern 61 is formed on one surface of the substrate 60, and the copper pattern 63 is on the other surface of the substrate 60. The first section 41A of the terminal electrode 41 of the lowermost one of the plurality of unit capacitors 10 constituting the thin film capacitor 1 is connected to the copper pattern 61 through the solder 50. Since the terminal electrode 42 is not formed on the upper surface 31A of the film 31 in the lowermost unit protective insulating capacitor 10, insulation between the terminal electrode 42 and copper pattern 61 is ensured. Further, the third section 42A of the terminal electrode 42 of the lowermost one of the plurality of unit capacitors 10 constituting the thin film capacitor 1 is connected to a bonding wire 70. Thus, the plurality of unit capacitors 10 are connected in series between the copper pattern 61 and bonding wire 70, allowing improvement of the dielectric withstand voltage of the thin film capacitor 1.

Figure 4:
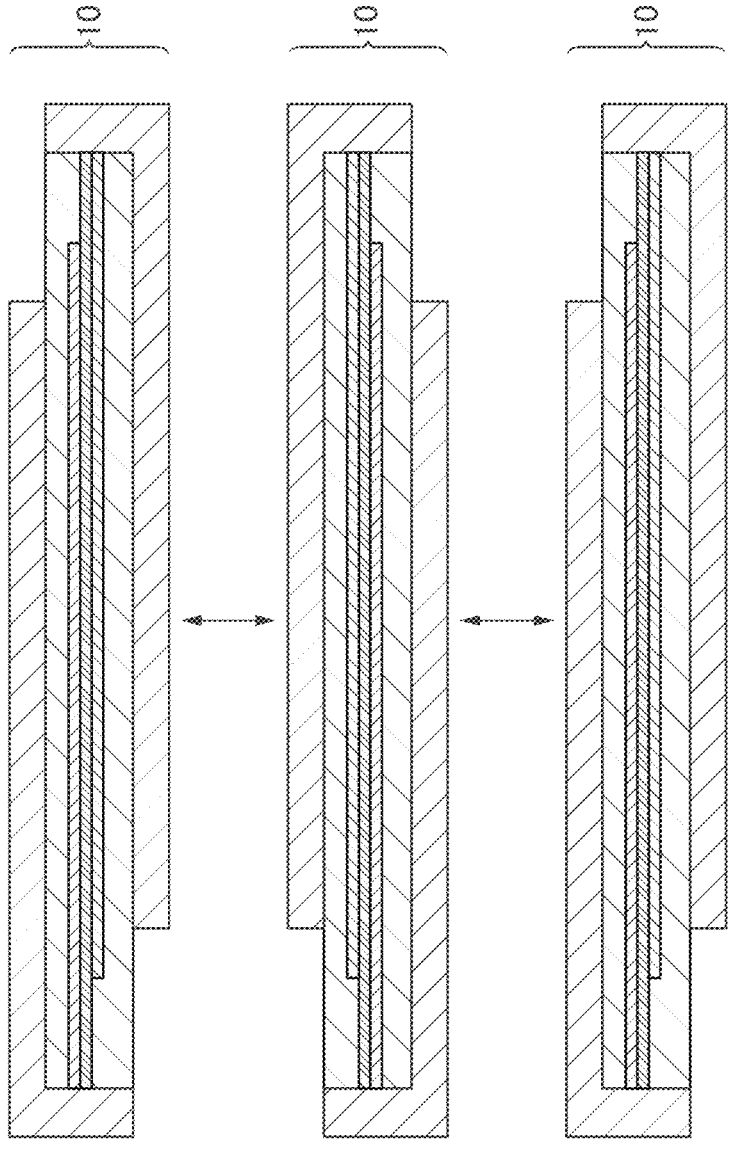
FIG. 4 is a schematic diagram for explaining a method of manufacturing the thin film capacitor 1.

The thin film capacitor 1 is manufactured as follows: a plurality of the unit capacitors 10 are taken from an aggregate substrate, followed by inspection, and unit capacitors 10 determined to be non-defectives are stacked as illustrated in FIG. 4. This allows achievement of a high manufacturing yield.

While the preferred embodiment of the present disclosure has been described, the present disclosure is not limited to the above embodiment, and various modifications may be made within the scope of the present disclosure, and all such modifications are included in the present disclosure.

REFERENCE SIGNS LIST 1 thin film capacitor
10 unit capacitor
20 dielectric layer
21, 22 capacitor electrode
31, 32 protective insulating film
31A, 32A upper surface of the protective insulating film
41, 42 terminal electrode
41A first section
41B second section
42A third section
42B fourth section
50 solder
60 substrate
61 copper pattern
61-63 copper pattern
70 bonding wire
E1, E2 edge
S1, S2 side surface

The invention claimed is:

1. A thin film capacitor comprising:
a dielectric layer having a first surface and a second surface positioned on an opposite side of the first surface;
a first capacitor electrode formed on the first surface of the dielectric layer;
a second capacitor electrode formed on the second surface of the dielectric layer;

6 a first protective insulating film formed on the first surface of the dielectric layer so as to embed therein the first capacitor electrode;
a second protective insulating film formed on the second surface of the dielectric layer so as to embed therein the second capacitor electrode;
a first terminal electrode electrically connected to the first capacitor electrode; and
a second terminal electrode electrically connected to the second capacitor electrode,
wherein each of the first protective insulating film and the second protective insulating film is made of a material different from a material of the dielectric layer,
wherein the first terminal electrode has a first section positioned on an upper surface of the first protective insulating film and partly overlapping the second capacitor electrode and a second section positioned on a side surface of the first protective insulating film so as to contact the first capacitor electrode, and
wherein the second terminal electrode is not formed on the upper surface of the first protective insulating film.

2. The thin film capacitor as claimed in claim 1,
wherein the second terminal electrode has a third section positioned on an upper surface of the second protective insulating film and partly overlapping the first capacitor electrode and a fourth section positioned on a side surface of the second protective insulating film so as to contact the second capacitor electrode, and
wherein the first terminal electrode is not formed on the upper surface of the second protective insulating film.

3. The thin film capacitor as claimed in claim 1, wherein each of the first protective insulating film and the second protective insulating film is made of resin.

4. The thin film capacitor as claimed in claim 1, wherein the first protective insulating film contacts both the first surface of the dielectric layer and the first capacitor electrode.

5. The thin film capacitor as claimed in claim 4, wherein the second protective insulating film contacts both the second surface of the dielectric layer and the second capacitor electrode.

6. The thin film capacitor as claimed in claim 1, wherein the first protective insulating film is thicker than the dielectric layer.

7. The thin film capacitor as claimed in claim 6, wherein the second protective insulating film is thicker than the dielectric layer.

8. The thin film capacitor as claimed in claim 1, wherein of the first capacitor electrode and the second capacitor electrode, the first capacitor electrode is an only capacitor electrode contacting the first terminal electrode.

9. The thin film capacitor as claimed in claim 8, wherein of the first capacitor electrode and the second capacitor electrode, the second capacitor electrode is an only capacitor electrode contacting the second terminal electrode.

10. A thin film capacitor including first and second unit capacitors,
wherein each of the first and second unit capacitors comprises:
a dielectric layer having a first surface and a second surface positioned on an opposite side of the first surface;
a first capacitor electrode formed on the first surface of the dielectric layer;
a second capacitor electrode formed on the second surface of the dielectric layer;

a first protective insulating film formed on the first surface of the dielectric layer so as to embed therein the first capacitor electrode;

a second protective insulating film formed on the second surface of the dielectric layer so as to embed therein the second capacitor electrode;

a first terminal electrode electrically connected to the first capacitor electrode; and a second terminal electrode electrically connected to the second capacitor electrode, wherein the first terminal electrode has a first section positioned on an upper surface of the first protective insulating film and partly overlapping the second capacitor electrode and a second section positioned on a side surface of the first protective insulating film so as to contact the first capacitor electrode, wherein the second terminal electrode is not formed on the upper surface of the first protective insulating film, and wherein the first and second unit capacitors are stacked such that (1) the first section of the first terminal electrode included in the first unit capacitor and the first section of the first terminal electrode included in the second unit capacitor are connected to each other; and (2) a surface of the first protective insulating film opposite the dielectric layer in the first unit capacitor and a surface of the first protective insulating film opposite the dielectric layer in the second unit capacitor face each other.

11. The thin film capacitor as claimed in claim 10, further including a third unit capacitor having a same configuration as those of the first and second unit capacitors, wherein the second terminal electrode has a third section positioned on an upper surface of the second protective insulating film and partly overlapping the first capacitor electrode and a fourth section positioned on a side surface of the second protective insulating film so as to contact the second capacitor electrode, wherein the first terminal electrode is not formed on the upper surface of the second protective insulating film, and wherein the first, second, and third unit capacitors are stacked such that the third section of the second terminal electrode included in the second unit capacitor and the third section of the second terminal electrode included in the third unit capacitor are connected to each other.

12. The thin film capacitor as claimed in claim 11, further comprising a solder provided between the second terminal electrode included in the second unit capacitor and the second terminal electrode included in the third unit capacitor.

13. The thin film capacitor as claimed in claim 11, wherein the second and third unit capacitors are stacked such that the second protective insulating film in the second unit capacitor and the second protective insulating film in the third unit capacitor face each other.

14. The thin film capacitor as claimed in claim 10, further comprising a solder provided between the first terminal electrode included in the first unit capacitor and the first terminal electrode included in the second unit capacitor.

15. The thin film capacitor as claimed in claim 10, wherein each of the first and second protective insulating films is made of resin.

16. The thin film capacitor as claimed in claim 10, wherein the first protective insulating film contacts both the first surface of the dielectric layer and the first capacitor electrode, and wherein the second protective insulating film contacts both the second surface of the dielectric layer and the second capacitor electrode.

17. A thin film capacitor comprising:

a dielectric layer having a first surface and a second surface positioned on an opposite side of the first surface;

a first capacitor electrode contacting the first surface of the dielectric layer;

a second capacitor electrode contacting the second surface of the dielectric layer;

a first protective insulating film contacting both the first surface of the dielectric layer and the first capacitor electrode and having an upper surface and a side surface;

a second protective insulating film contacting both the second surface of the dielectric layer and the second capacitor electrode and having an upper surface and a side surface;

a first terminal electrode having a first section contacting the upper surface of the first protective insulating film and a second section contacting the side surface of the first protective insulating film so as to contact the first capacitor electrode; and a second terminal electrode having a third section contacting the upper surface of the second protective insulating film and a fourth section contacting the side surface of the second protective insulating film so as to contact the second capacitor electrode, wherein the upper surface of the first protective insulating film is free from the second terminal electrode, and wherein the upper surface of the second protective insulating film is free from the first terminal electrode.

18. The thin film capacitor as claimed in claim 17, wherein each of the first protective insulating film and the second protective insulating film is made of resin.

19. The thin film capacitor as claimed in claim 17, wherein each of the first protective insulating film and the second protective insulating film is thicker than the dielectric layer.

* * * * *